(12) United States Patent
Fatula et al.

(10) Patent No.: US 10,221,082 B2
(45) Date of Patent: Mar. 5, 2019

(54) AMELIORATION OF ACID MINE DRAINAGE

(71) Applicant: LANXESS Sybron Chemicals, Inc., Birmingham, NJ (US)

(72) Inventors: Philip W. Fatula, Beaver Falls, PA (US); Anthony P. Tirio, Pittsburgh, PA (US); Lillianne Falco, Westampton, NJ (US); Wilwood Matthews, Pennsauken, NJ (US)

(73) Assignee: LANXESS Sybron Chemicals Inc., Birmingham, NJ (US)

( * ) Notice: Subject to any disclaimer, the term of this patent is extended or adjusted under 35 U.S.C. 154(b) by 266 days.

(21) Appl. No.: 15/031,555

(22) PCT Filed: Oct. 23, 2014

(86) PCT No.: PCT/US2014/061884
§ 371 (c)(1),
(2) Date: Apr. 22, 2016

(87) PCT Pub. No.: WO2015/061525
PCT Pub. Date: Apr. 30, 2015

(65) Prior Publication Data
US 2016/0257580 A1 Sep. 8, 2016

Related U.S. Application Data

(60) Provisional application No. 61/895,571, filed on Oct. 25, 2013.

(51) Int. Cl.
C02F 1/42 (2006.01)
C01B 7/03 (2006.01)
(Continued)

(52) U.S. Cl.
CPC ............... *C02F 1/42* (2013.01); *B01J 41/05* (2017.01); *B01J 41/07* (2017.01); *B01J 41/14* (2013.01);
(Continued)

(58) Field of Classification Search
CPC ............... C02F 1/42; C02F 2001/422; C02F 2101/101; C02F 2103/10; C02F 2303/16; C02F 2303/22; B01J 41/05; B01J 41/07; B01J 41/14; B01J 49/07; B01J 41/57; C01B 7/035
See application file for complete search history.

(56) References Cited

U.S. PATENT DOCUMENTS 3,388,058 A * 6/1968 Wirth, Jr. ............... B01J 41/05
210/673
3,842,002 A * 10/1974 Gianfranco ............ C02F 1/42
210/673

(Continued)

FOREIGN PATENT DOCUMENTS

WO WO 2012042483 A1 * 4/2012 ............ C02F 1/42
WO WO 2012166670 A2 * 12/2012 ............ C02F 1/4674

*Primary Examiner* — Matthew O Savage

(57) ABSTRACT

A process for the amelioration of acid mine drainage useful in shale hydrolyic fracturing operations for the production of natural gas involving the exchange of sulfate and chloride ions by an ion exchange resin so as to produce hydrochloric acid and water for use in hydrolyic fracturing operations from acid mine drainage.

17 Claims, 2 Drawing Sheets

(51) Int. Cl.
  *B01J 41/14*   (2006.01)
  *B01J 41/05*   (2017.01)
  *B01J 41/07*   (2017.01)
  *B01J 49/07*   (2017.01)
  *B01J 49/57*   (2017.01)
  *C02F 101/10*  (2006.01)
  *C02F 103/10*  (2006.01)

(52) U.S. Cl.
  CPC ............... *B01J 49/07* (2017.01); *B01J 49/57* (2017.01); *C01B 7/035* (2013.01); *C02F 2001/422* (2013.01); *C02F 2101/101* (2013.01); *C02F 2103/10* (2013.01); *C02F 2303/16* (2013.01); *C02F 2303/22* (2013.01)

(56) References Cited

U.S. PATENT DOCUMENTS

| | | | | |
|---|---|---|---|---|
| 2010/0307972 | A1* | 12/2010 | Bratty | C02F 1/42 |
| | | | | 210/635 |
| 2011/0158869 | A1* | 6/2011 | Takahashi | C01B 7/0706 |
| | | | | 423/140 |
| 2011/0297382 | A1* | 12/2011 | Tirio | C09K 8/68 |
| | | | | 166/308.1 |

* cited by examiner

AMELIORATION OF ACID MINE DRAINAGE

This application claims priority to provisional U.S. Application No. 61/895,571, filed Oct. 25, 2013, entitled AMELIORATION OF ACID MINE DRAINAGE, incorporated herein by reference.

The present invention relates generally to a process for the amelioration of acid mine drainage, which in one embodiment is useful in shale hydrolyic fracturing operations for the production of natural gas and, more particularly, relates to a process involving the exchange of sulfate and chloride ions by an ion exchange resin so as to provide hydrochloric acid and water for use in hydrolyic fracturing operations from acid mine drainage.

The remediation of acid mine drainage (herein "AMD") is a topic of extensive consideration (see, e.g., *Handbook of Technologies for Avoidance and Remediation of Acid Mine Drainage*, J. Skousen at al. (1998)). As used herein AMD is understood to mean water that has a pH<6.0 and contains net acidity (acidity greater than alkalinity), and may contain iron and other metals. AMD includes acidic, iron and sulfate water formed under conditions where pyrite, or ferrous sulfide ($FeS_2$), is exposed to oxidizing environments and can result from coal mining both in surface and in underground mines. For example, abandoned coal mines provide well cavities that allow for the collection of ground water. Over time, the accumulation of water exceeds the capacity of the mine and water escapes from the mine. The water picks up various contaminants some of the most prominent and troublesome being sulfur compounds.

Pyrite is the major source of sulfur that causes problems associated with acid mine drainage. The following illustrative equations have been proposed related to ferrous sulfide:

$$2FeS_2 + 7O_2 + 2H_2O \rightarrow 2FeSO_4 + 2H_2SO_4 \quad (I)$$

wherein water and oxygen dissolved in the water convert iron sulfide to iron sulfate and sulfuric acid.

A portion of the iron sulfate undergoes further oxidation to give:

$$2FeS_2 + 1/2O_2 + 2H_2SO_4 \rightarrow Fe_2(SO_4)_3 + 2H_2SO_4 \quad (II).$$

The resultant ferric sulfate is hydrolyzed to form ferric hydroxide and sulfuric acid, as follows:

$$Fe_2(SO_4)_3 + 6H_2O \rightarrow 2Fe(OH)_3 + 3H_2(SO_4) \quad (III).$$

To date, recommendations for AMD remediation involve expenditure of resources to return AMD to a non-hazardous condition for discharge into natural water resources. Reducing acidity is, therefore, the major goal of most treatment systems. A prominent treatment method currently in use is the reaction of limestone with the mineral add component of AMD. It is expected that the residual contamination of the treated AMD will be diluted sufficiently to make it acceptable for discharge.

Turning toward natural gas recovery, it should be understood that the extraction of natural gas from various shale formations has grown rapidly due to recent technological advances in horizontal drilling and hydraulic fracturing. Hydraulic fracturing overcomes the impermeability of shale relative to the release of natural gas trapped in a rock formation. Horizontal drilling allows greater gas collection from each well out of the relatively shallow but expansively wide shale formations.

Shale formations, such as the Marcellus Shale formation, may have a very tight structure that does not allow trapped natural gas to migrate through the formation easily. To facilitate gas movement, the shale formation must be fractured and fissures induced in the rock. To accomplish this, fluids, predominantly water with a solid such as sand, are pumped at high pressure underground to crack the rock formation and wedge it open. The fluids used for hydraulic fracturing are known as "frac fluids." Hydrochloric acid is often added to these frac fluids. The hydrochloric acid is used to dissolve fragments of rock as well as drilling muds and sealing cement that would otherwise impede gas flow.

Additives may also be used with the frac fluids. These so-called "frac fluid additives" may comprise a myriad of additive compounds of specific type and quantity necessary to meet, among others, the requirements of the shale formation, well depth and well characteristics. Frac fluid additives may comprise, and/or exclude, one or more of scale inhibitors, corrosion inhibitors, biocides, viscosity modifiers, lubricants, surfactants, oxygen scavengers, proppants, and other additive compounds and combinations thereof.

As provided herein there is a process to convert AMD into a useful component of natural gas production. Instantly, there is broadly contemplated, in accordance with at least one presently preferred embodiment of the present invention, a process, comprising: providing an anion exchange resin in chloride form, providing an acid mine drainage solution, wherein the acid mine drainage solution comprises hydrogen sulfate, providing a salt solution, wherein the salt solution comprises a neutral chloride salt, providing one or more contacting vessels, contacting, in the one or more contacting vessels, the anion exchange resin in the chloride form with the acid mine drainage solution, whereby sulfate ions and chloride ions are exchanged, thereby, forming an anion exchange resin in sulfate form and an effluent comprising hydrogen chloride, contacting, in the one or more contacting vessels, the anion exchange resin in sulfate form with the salt solution, whereby sulfate ions and chloride ions are exchanged, thereby, forming a regenerated anion exchange resin in chloride form and an eluate comprising sodium sulfate.

A portion of the effluent comprising hydrogen chloride may be deposited underground. As in the context of an embodiment, underground may be under the earth's surface, or subterranean. In an embodiment, the effluent may be combined with at least one of the frac fluid additives as mentioned above, in a variant, the effluent may be added to a frac fluid aboveground to thereby produce a second, treated frac fluid, and this second frac fluid may then be introduced underground.

Alternatively, at least a portion of the effluent may be concentrated to provide a more concentrated hydrogen chloride that may then be useable for further commercial purposes.

Two aspects allowing hydrochloric acid to replace sulfuric acid in fracture fluid operations are noted. Acid mine drainage is an environmental and financial detriment to coal producing companies. Anything that could convert AMD from a cost to a benefit would be attractive to the coal companies. Secondly, the WBA resin can be converted from sulfuric acid form to hydrochloric acid form by regenerating with a source of concentrated chloride ion. The required chloride could be obtained from common road salt or could be obtained from shale gas well blowback water.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE SEVERAL VIEWS OF THE DRAWINGS

Referring to the drawings, in FIGS. 1 and 2 there is shown features of a preferred embodiment of the invention. FIGS. 1 and 2 show the process for the amelioration of acid mine drainage involving the exchange of sulfate and chloride ions by an ion exchange resin so as to produce hydrochloric acid and water for use in hydrolyic fracturing operations from acid mine drainage as well as the regeneration of the resin.

The ion exchange resin may be either a weakly basic anion exchange resin or a strongly basic anion exchange resin. A weakly basic anion exchange resin may be a crosslinked, monodisperse, macroporous, polystyrene resin functionalized with tertiary amine groups and in chloride form. A strongly basic anion exchange resin may be a crosslinked, monodisperse, macroporous, polystyrene resin functionalized with quarternary ammonium groups and in chloride form.

Weakly basic anion exchange resins (WBA) can be charged with hydrochloric acid to produce a resin in chloride form. The chloride may be exchanged for sulfuric acid found in AMD. Sulfuric acid is used in hydraulic fracturing of shale in the production of natural gas. The acidic portion of sulfuric acid is required to dissolve some mineral components found in gas bearing shale. The sulfate component of sulfuric acid contributes to the scaling potential found in shale gas wells. If hydrochloric acid could economically replace sulfuric acid, the scaling potential would be reduced.

Conceptually, AMD is processed through weakly basic anion resin that has been charged with hydrochloric acid. A sulfate ion from the sulfuric acid in AMD will displace to chloride ions held by the WBA. After the chloride content of the WBA has been exhausted, the WBA can be converted by to hydrochloric acid form by regenerating with a concentrated chloride solution.

Weakly Basic Anion (WBA) exchangers are typically of the form shown below.

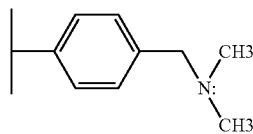

WBA resins will not "split" salts in the manner that strongly basic anion exchangers can. WBA can "capture" acids without causing them to ionize into positively and negatively charged components.

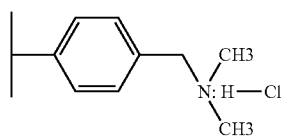

WBA can absorb only strong acids but not salts of those acids.

Figure 1:
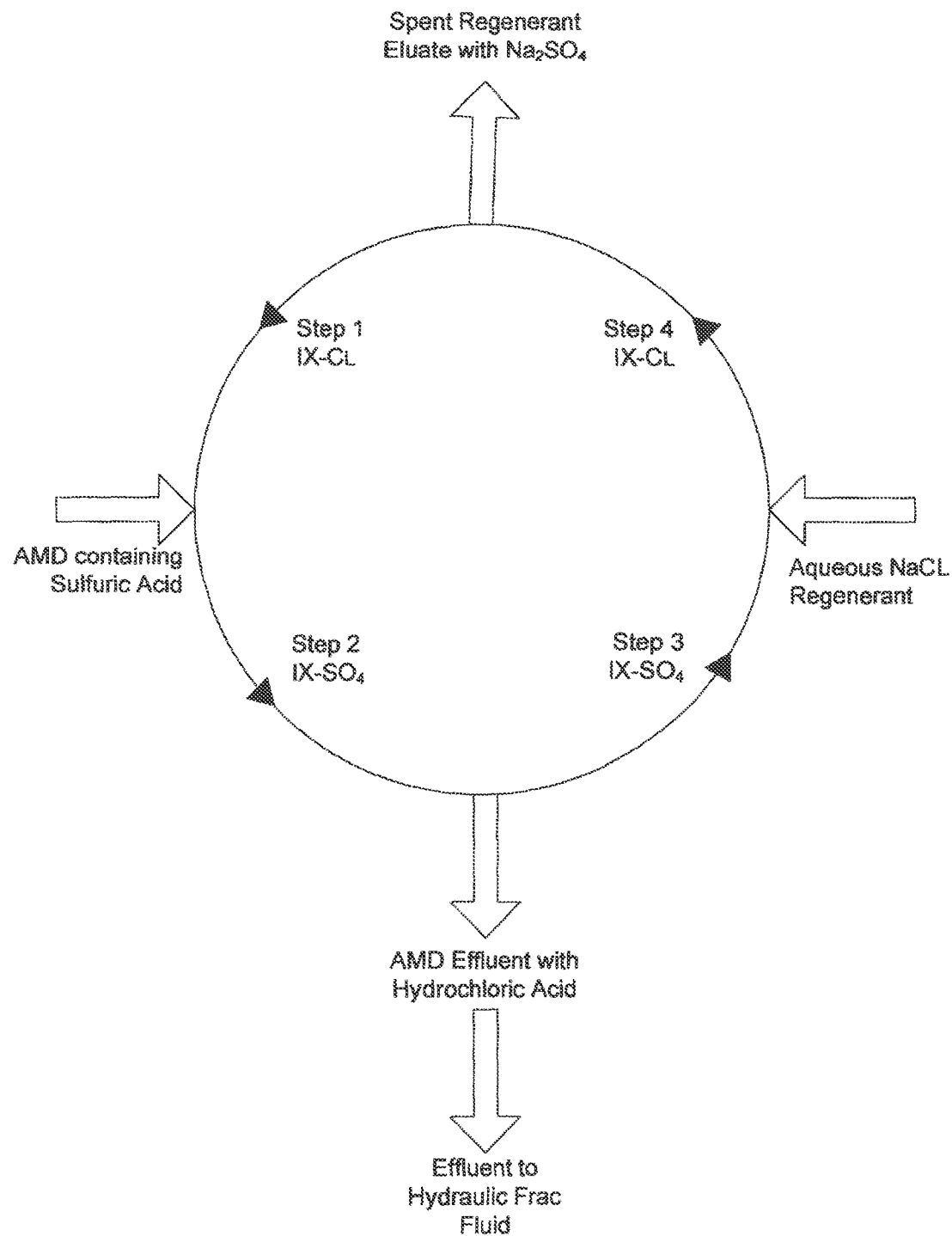
FIG. 1 schematically illustrates one embodiment of the invention in which there is shown a process for the amelioration of acid mine drainage.
Figure 2:
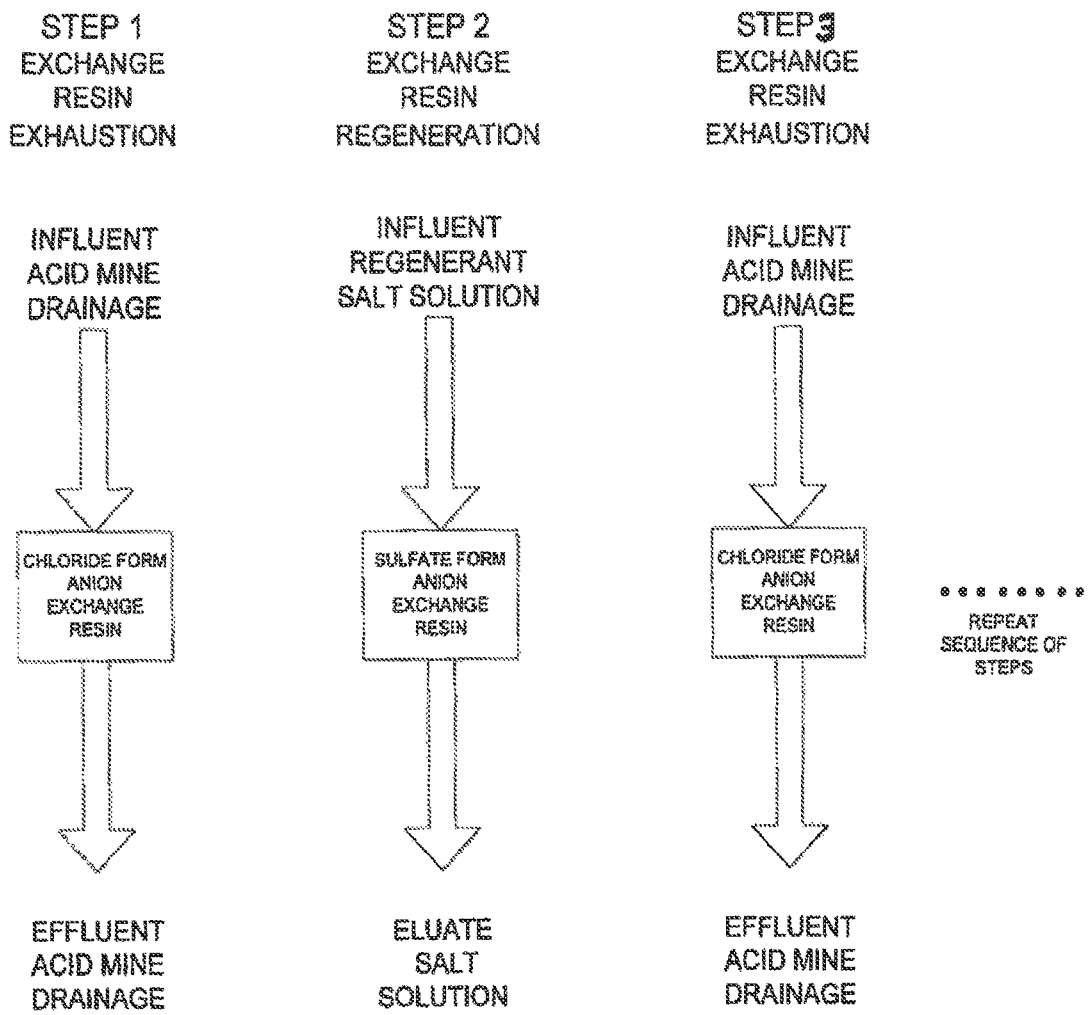
FIG. 2 schematically illustrates another embodiment of the invention in which there is shown a process for the amelioration of acid mine drainage.

When two WBA function groups that have been exposed to hydrochloric acid are flushed with a solution of sulfuric add, an exchange will take place as shown in FIG. 1.

Divalent sulfate ion from the bulk fluid displaces two chloride ions attached as hydrochloric acid on the WBA resin. As a result, the bulk fluid has diminished sulfuric acid as it is replaced with hydrochloric acid.

In one embodiment, at least a portion of the effluent containing the hydrochloric acid may be introduced underground in further fracking processes, such as, for example, by pumping at least a portion of the effluent comprising hydrogen chloride, under pressure, into underground shale formation to fracture the shale formation to allow for natural gas withdrawal from the shale formation. Alternatively, at least a portion of the effluent may be concentrated to provide a more concentrated hydrogen chloride that may then be useable for further commercial purposes. For example, the hydrogen chloride may be concentrated to at least about 10% HCl in water. In various embodiments, the hydrogen chloride may be concentrated to at least about 15%, at least about 20%, at least about 25% or at least about 30%. The hydrogen chloride may be concentrated by at least one of thermal, chemical or physical concentration methods, that may include, for example, distillation, solvent extraction, extractive rectification, membrane separation, or other methods.

After the chloride ion content of the conditioned WBA is exhausted, it must be replaced. Regeneration of the WBA that has been saturated with divalent sulfate ions involves exposing that WBA to high concentrations of chloride ion. The source of chloride can be from rock salt dissolved in water. An additional source of high chloride content water may be the blowback water that evolved from the shale gas well itself.

In essence, sulfuric add in AMD as been replaced with hydrochloric acid that is generated with sodium chloride (or calcium chloride) through use of WBA resins.

Without wishing to be bound by theory, a portion of the sodium chloride in the regeneration fluid is replaced with sodium sulfate.

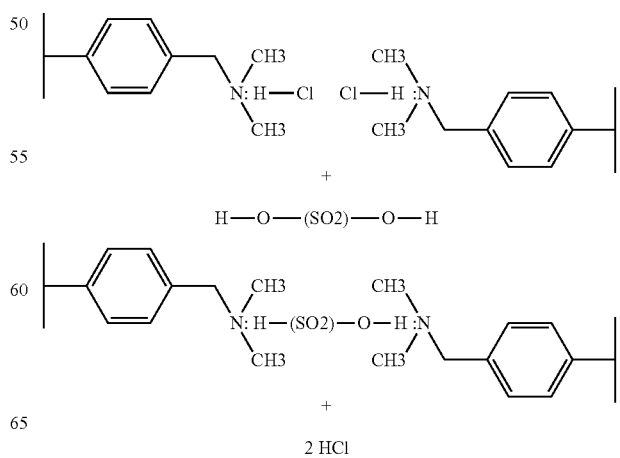

Formula 1

-continued

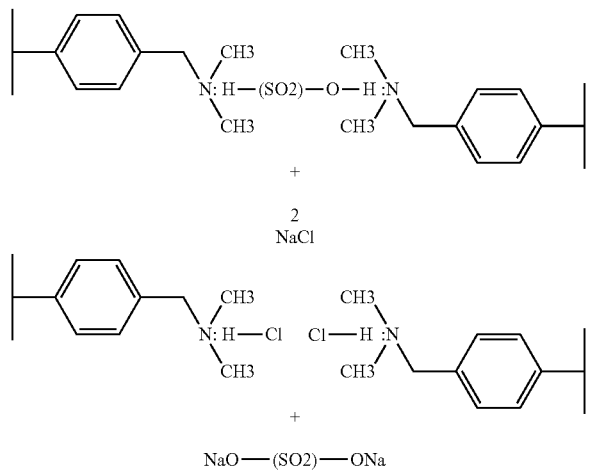

Formula 2

It should also be noted that since sulfuric acid is diprotic, AMD will may contain some both bisulfate and sulfate, as such the following resins would also be possible although in very small concentrations:

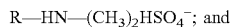

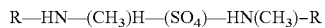

Although the preferred embodiment of the present invention has been described herein with reference to the accompanying drawings, it is to be understood that the invention is not limited to that precise embodiment, and that various other changes and modifications may be affected therein by one skilled in the art without departing from the scope or spirit of the invention.

What is claimed is:

1. A process for treating acid mine drainage, the process comprising:
    contacting an anion exchange resin in chloride form with acid mine drainage solution containing hydrogen sulfate for exchange of sulfate ions in the acid mine drainage solution with chloride ions of the anion exchange resin to form an anion exchange resin in sulfate form and an effluent comprising hydrogen chloride,
    contacting the anion exchange resin in sulfate form with a salt solution of a neutral chloride salt for exchange of sulfate ions on the anion exchange resin with chloride ions of the salt solution to form a regenerated anion exchange resin in chloride form and an eluate comprising sodium sulfate.

2. The process according to claim 1, wherein the ion exchange resin is a weakly basic anion exchange resin.

3. The process according to claim 2, wherein the weakly basic anion exchange resin is a crosslinked, monodisperse, macroporous, polystyrene resin functionalized with tertiary amine groups and in chloride form.

4. The process according to claim 1, wherein the ion exchange resin is a strongly basic anion exchange resin.

5. The process according to claim 4, wherein the strongly basic anion exchange resin is a crosslinked, monodisperse, macroporous, polystyrene resin functionalized with quarternary ammonium groups and in chloride form.

6. The process according to claim 1, further comprising combining the effluent with a frac fluid additive.

7. The process according to claim 6, wherein the frac fluid additive is selected from the group consisting of scale inhibitors, corrosion inhibitors, biocides, viscosity modifiers, lubricants, surfactants, oxygen scavengers, proppants, and combinations thereof.

8. The process according to claim 1, further comprising depositing of at least a portion of the effluent underground.

9. The process according to claim 8, wherein underground is subterranean, and the depositing further comprises:
    adding the effluent to a frac fluid aboveground to form a second frac fluid, and
    introducing the second frac fluid underground.

10. The process according to claim 1, further comprising concentrating the effluent to concentrate the hydrogen chloride in the effluent.

11. The process according to claim 10, wherein the concentrating of the effluent comprises concentrating the hydrogen chloride to at least about 10% HCl in water.

12. The process according to claim 11, wherein the concentrating of the effluent comprises at least one of: thermal, chemical and physical concentration methods.

13. A method for converting and using acid mine drainage for hydraulic fracturing in natural gas recovery in shale formations, the method comprising:
    contacting an anion exchange resin in chloride form with acid mine drainage to exchange sulfate ions of the acid mine drainage with chloride ions of the anion exchange resin, thereby forming an anion exchange resin in sulfate form and an effluent comprising hydrogen chloride;
    pumping at least a portion of the effluent comprising hydrogen chloride, under pressure, into underground shale formation to fracture the shale formation to allow for natural gas withdrawal from the shale formation.

14. The method according to claim 13, further comprising regenerating the anion exchange resin by contacting the anion exchange resin in sulfate form with a salt solution containing a neutral chloride salt to exchange the sulfate ions on the anion exchange resin with chloride ions of the salt solution, thereby regenerating the anion exchange resin back into chloride form and forming an eluate comprising sodium sulfate.

15. The process according to claim 14, wherein the anion exchange resin is one of:
    a weakly basic anion exchange resin; and
    a strongly basic anion exchange resin.

16. The process according to claim 15, wherein:
    the weakly basic anion exchange resin is a crosslinked, monodisperse, macroporous, polystyrene resin functionalized with tertiary amine groups and in chloride form; and
    the strongly basic anion exchange resin is a crosslinked, monodisperse, macroporous, polystyrene resin functionalized with quarternary ammonium groups and in chloride form.

17. The process according to claim 13, wherein the effluent comprising hydrogen chloride is combined with frac fluid, and the frac fluid comprising the effluent is injected into the shale formation.

* * * * *